(12) United States Patent
Guillot

(10) Patent No.: US 10,305,543 B2
(45) Date of Patent: May 28, 2019

(54) DEVICE FOR TRANSMISSION BY POWER-LINE COMMUNICATION IN AN AIRCRAFT

(71) Applicant: SAFRAN ELECTRONICS & DEFENSE, Boulogne-Billancourt (FR)

(72) Inventor: Francois Guillot, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/089,826

(22) PCT Filed: Mar. 30, 2017

(86) PCT No.: PCT/EP2017/057497
§ 371 (c)(1),
(2) Date: Sep. 28, 2018

(87) PCT Pub. No.: WO2017/167854
PCT Pub. Date: Oct. 5, 2017

(65) Prior Publication Data
US 2019/0132026 A1    May 2, 2019

(30) Foreign Application Priority Data

Mar. 31, 2016 (FR) ...................... 16 52808

(51) Int. Cl.
*H04B 3/54* (2006.01)
*B64D 47/00* (2006.01)

(52) U.S. Cl.
CPC .............. *H04B 3/542* (2013.01); *B64D 47/00* (2013.01); *B64D 2221/00* (2013.01); *H04B 3/548* (2013.01)

(58) Field of Classification Search
CPC ........ H04B 3/542; H04B 3/548; B64D 47/00; B64D 2221/00
(Continued)

(56) References Cited

U.S. PATENT DOCUMENTS

| 8,495,445 B2 * | 7/2013 | Tsuchie ................. H04L 1/0045 714/747 |
| 2009/0304101 A1 * | 12/2009 | LoPorto .................. G01D 4/004 375/260 |

(Continued)

FOREIGN PATENT DOCUMENTS

| FR | 2965657 A1 | 4/2012 |
| FR | 3012617 A1 * | 5/2015 ............. G01R 31/11 |

(Continued)

OTHER PUBLICATIONS

Preliminary Research Report received for French Application No. 1652808, dated Dec. 6, 2016, 3 pages (1 page of French Translation Cover Sheet and 2 pages of original document).

(Continued)

*Primary Examiner* — Hirdepal Singh
(74) *Attorney, Agent, or Firm* — Womble Bond Dickinson (US) LLP

(57) ABSTRACT

The present invention relates to a device for transmission by power-line communication (1) between two items of equipment (10, 20) on board an aircraft (1), comprising a transmission cable (3) configured to simultaneously transmit a power supply current and a data signal. This cable (3) comprises two twisted pairs of conductors (34, 34*a*, 34*b*). The device comprises a data sender (100) comprising a COFDM coupler (44) configured to modulate a signal by carrier modulation according to a COFDM mode, and a data receiver (200) comprising a COFDM coupler (44) configured to demodulate a signal modulated by carrier modulation according to a COFDM mode. The data sender (100) is (Continued)

configured to send a test signal by carrier modulation according to a COFDM mode, while the data receiver (200) is configured to detect signals corresponding to the test signals sent, and to analyze the carriers of the detected signal in regard to the signal sent and deduce therefrom the state of the transmission cable (3).

10 Claims, 5 Drawing Sheets

(58) Field of Classification Search
USPC .......................................................... 375/257
See application file for complete search history.

(56) References Cited

U.S. PATENT DOCUMENTS

| | | |
|---|---|---|
| 2010/0049830 A1 | 2/2010 | Chenu et al. |
| 2010/0104054 A1* | 4/2010 | Scott ........................ H01Q 3/04 |
| | | 375/347 |
| 2013/0091208 A1* | 4/2013 | Rajakarunanayake . H04W 4/21 |
| | | 709/204 |
| 2014/0112398 A1* | 4/2014 | Kamalizad .......... H04L 27/2655 |
| | | 375/257 |

FOREIGN PATENT DOCUMENTS

| | | |
|---|---|---|
| FR | 3049412 A1 * | 9/2017 |
| GB | 2264424 A | 8/1993 |
| WO | 2014/044138 A1 | 3/2014 |

OTHER PUBLICATIONS

International Search Report and Written Opinion received for PCT Patent Application No. PCT/EP2017/057497, dated Jun. 7, 2017, 18 pages (9 pages of English Translation and 9 pages of Original Document).

International Preliminary Report on Patentability received for PCT Patent Application No. PCT/EP2017/057497, dated Oct. 11, 2018, 14 pages (8 pages of English Translation and 6 pages of Original Document).

* cited by examiner

RT : Real Time
BE : Best Effort
C : CRC or ECC
S : Syncro

DEVICE FOR TRANSMISSION BY POWER-LINE COMMUNICATION IN AN AIRCRAFT

FIELD OF THE INVENTION

The present invention relates to the field of simultaneous transmission of power and data by power-line communication between items of equipment on board an aircraft.

PRIOR ART

The term Power Line Communication or CPL refers to a technology for transfer of digital information by passing through an electric power distribution line. In particular, CPL technology is currently used on low-power terrestrial networks (alternating current at 50 Hz or 60 Hz).

Power-lines were already used on terrestrial networks for low-rate industrial or home automation applications.

In terms of terrestrial applications, the principle of power-line communication consists of superposing the classic current power supply with a higher-frequency and low-power signal. This second signal spreads over the electrical installation and can be received and decoded remotely. In this way, the CPL signal is received by any CPL receiver which is on the same network electrical.

The aim of the present invention is particularly CPL applications on board aircraft. In these fields, the mass and bulk engendered by the cabling on board aircraft represent considerable cost which must be limited as far as possible.

Power cables generally supplying continuous power for items of on-board equipment are constituted by a pair of twisted copper wires.

These cables generate parasite couplings causing transmission errors which can be corrected only depending on the rate of transmitted information.

Items of equipment on board an aircraft are subject to specific requirements in terms of reliability of information transmitted and safety that are not met by prior art systems for transmission by power-line communication.

They are also in severe physical environments which can cause deteriorations in cables due to vibrations, temperature stress, pressure stress, etc.

It has already been proposed by patent application FR2965657 to use twisted pairs of conductors which are crossed together for executing communications via CPL between two items of equipment on board an aircraft.

SUMMARY OF THE INVENTION

An aim of the invention is to provide a system for transmitting power and electrical signals simultaneously between items of equipment on board an aircraft respecting the reliability and safety restrictions specific to items of equipment on board an aircraft.

Yet another aim of the invention is to propose a technique for monitoring the state of the cables.

The present invention proposes especially a device for transmission by power-line communication between two items of equipment on board an aircraft, the device for transmission by power-line communication comprising a transmission cable connecting the two items of equipment, the transmission cable being configured to simultaneously transmit a power supply and a data signal.

The use of power-line communication in an aircraft radically limits the number of connectors and wires, substantially limiting the mass and bulk of items of equipment on board an aircraft.

The transmission cable comprises two twisted pairs of conductors.

The use of a transmission cable comprising two twisted pairs of conductors generates capacitive and inductive couplings ensuring the quality of the transmission of information and allowing the use of power-line communication in an aircraft.

The device comprises also a data sender comprising a COFDM coupler configured to modulate a signal by carrier modulation according to a COFDM mode, and a data receiver comprising a COFDM coupler configured to demodulate a signal modulated by carrier modulation according to a COFDM mode.

The data sender is configured to send a test signal by carrier modulation according to a COFDM mode.

The data receiver is as such configured to detect signals corresponding to the sent test signals and analyse the carriers of the detected signal with respect to the sent signal and deduce therefrom the state of the transmission cable.

Such a configuration serves to pass maximum data by eliminating imperfections in cables and outside the power transmission noise spectrum.

It tracks the state of the transmission cable.

The invention is advantageously completed by the following characteristics, taken individually or in any of their technically possible combinations:
- the test signal is transmitted in a frequency band higher than a frequency band of the data signal;
- the sender is configured to transmit simultaneously data signals with test signals;
- the data receiver is configured to analyse the frequency response of detected signals for detecting a malfunction of at least one carrier and deduce therefrom an alteration of the transmission cable;
- the data receiver is configured to locate a malfunction along the transmission cable as a function of the frequency of an altered carrier;
- the data receiver is configured to monitor over time the amplitudes of the different carriers to identify degradations of the transmission cable;
- the data sender and the data receiver each comprise an inductive coupler between the COFDM coupler and the transmission line filtering the data signals by letting through only those signals having a frequency greater than the frequency of the power supply,
- and the data sender and the data receiver each comprise a low-pass filter filtering the power supply by letting through only those signals having power less than the frequency of the data signals;
- the data sender and the data receiver are data senders/receivers, the transmission cable being configured to transmit bidirectional data, one of the pairs of conductors being allocated to the transmission of data in one direction, the other pair of conductors being allocated to the transmission of data in the other direction.
- the data receiver comprises a measuring module of the power supply for detecting variations of the series resistance of the transmission cable;
- the data sender is configured to allocate separate transmission time slots for data critical to the safety of the aircraft and data non-critical to the safety of the aircraft.

DESCRIPTION OF FIGURES

Other aims, characteristics and advantages will emerge from the following detailed description in reference to the appended drawings given by way of illustration and non-limiting, in which.

DETAILED DESCRIPTION OF THE INVENTION

Figure 1:
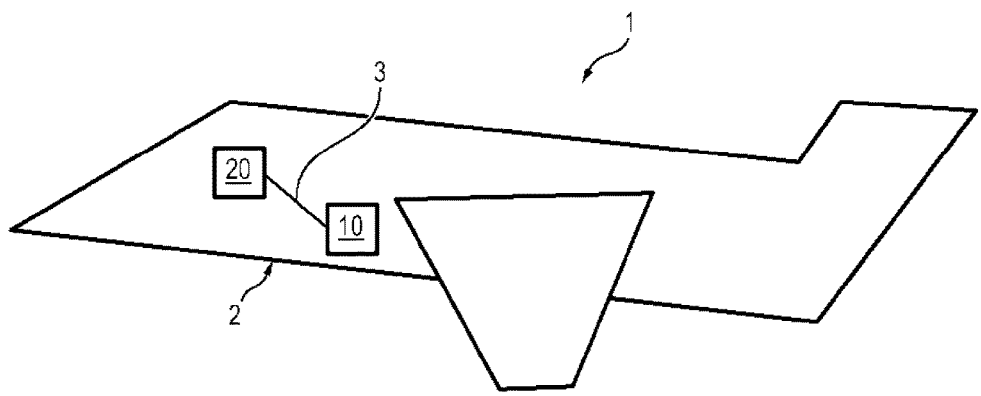
FIG. 1 illustrates an aircraft equipped with a device for simultaneous transmission of power and data between two items of equipment on board the aircraft according to the invention.

FIG. 1 illustrates an aircraft 1 equipped with a transmission device 3 by power-line communication between at least two items of equipment 10 and 20 on board the aircraft 1.

One of the items of equipment 10 is supplied by a power source 300 of high-voltage continuous current, and the other equipment 20 is supplied by the electrical power conveyed by the transmission cable 3.

One of the items of on-board equipment 10 is for example the central computer of the aircraft 1 and the others 20 are navigation peripherals, for example piloting instruments (artificial horizon, anemometer, altimeter, variometer, etc.), navigation instruments (compass, ILS, VOR, GPS, etc.), instruments for managing propulsion systems (tachymeter, temperature and pressure, etc.), instruments for managing telecommunications (radio, on-board intercommunication system, etc.), airborne support instruments (consumption of fuel, voltage and power density, etc.) or other specialised instruments.

Figure 2:
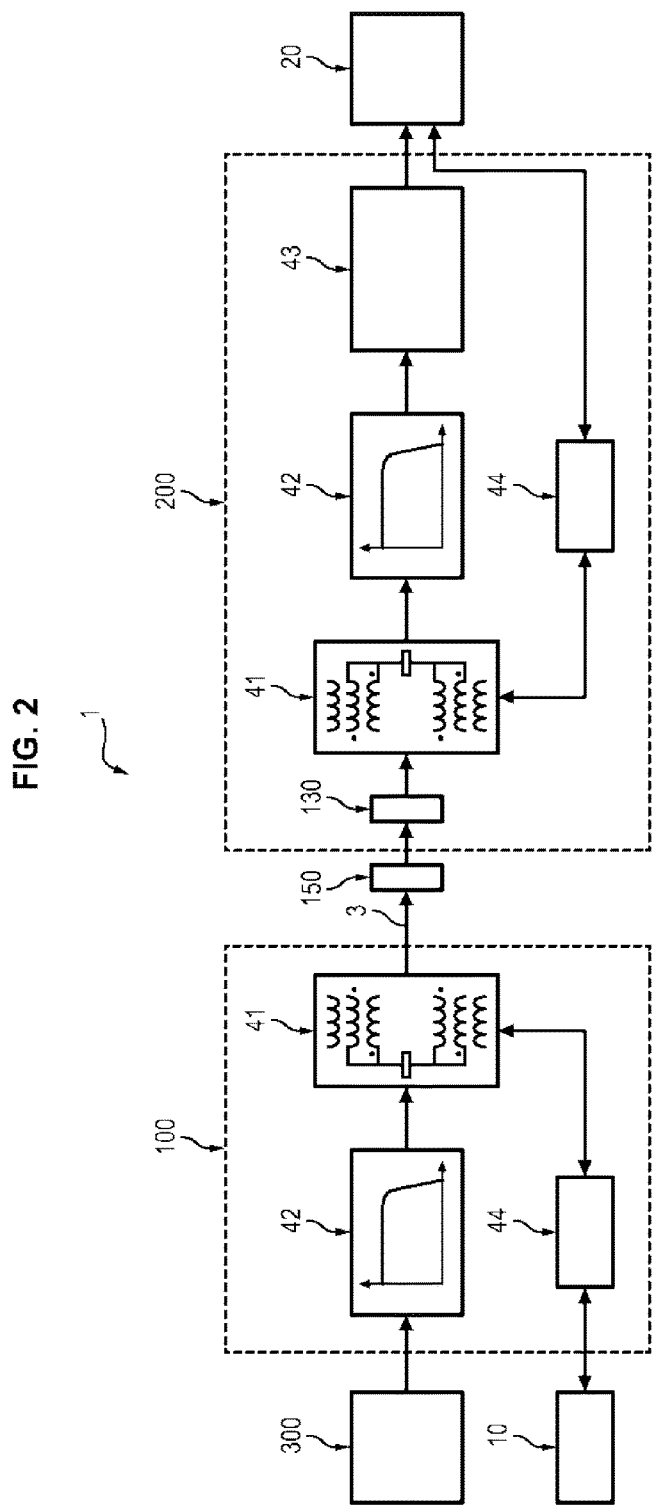
FIG. 2 is a schematic view of a transmission device according to the invention.

In reference to FIG. 2, the transmission device 3 by power-line communication comprises a data sender 100 intended to be connected to one of the items of equipment 10 and a data receiver 200 intended to be connected to the other equipment 20.

The simultaneous transmission device 3 for power and data comprises a transmission cable 3 connecting the data receiver 200 to the data sender 100 and to the power source 300.

The sender 100 and the receiver 200 can in particular be senders/receivers configured for transmission of bidirectional data.

The cable 3 is intended to transport high-voltage direct or alternating current (HVAC or HVDCDC), typically 50 or 60 Hz and 540 V, and higher-frequency data, typically 3 to 300 MHz and lower-energy data, typically 1 to 10 dBm).

Figure 3:
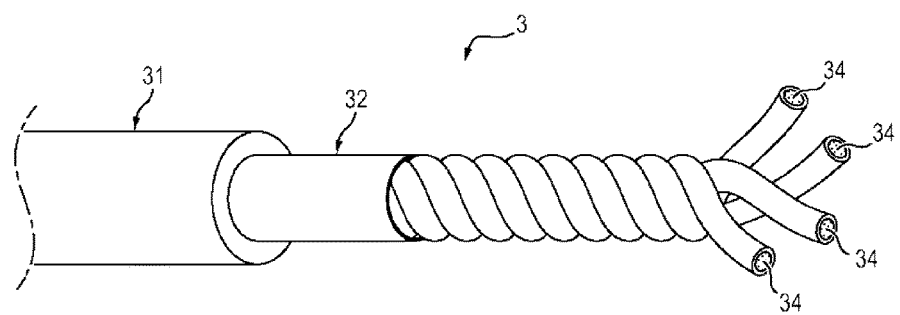
FIG. 3 represents a cable of a transmission device according to the invention.

In reference to FIG. 3, the transmission cable 3 is a star cable (or 'star quad') which comprises two twisted pairs of conductors 34.

Each conductor 34 is enclosed by an insulating layer.

The two pairs of conductors 34 are arranged at the apex of a square, the two conductors of the same pair being arranged according to a diagonal of the square.

The relative positioning of the conductors 34 forming the cable 3 generates capacitive and inductive couplings which ensure the quality of the transmission of information.

These couplings must be made all the more precisely since the aim is to have a large rate of information pass through.

Any malfunction in symmetry of the four-wire star cable is revealed by parasite couplings causing transmission errors which can be corrected only depending on the rate of transmitted information.

The conductors 34 are for example fixed to a carrier member of cylindrical shape by adhesive so as to maintain their respective positions. During realisation of the star quad, the four conductors 34 are twisted and guided to be held precisely at the apex of a square.

The two twisted pairs of conductors 34 are enclosed by metallic shielding 31 and optionally a sheath 32 of paper or polyester for example for mechanical hold.

The shielding 31 can be connected in particular to the metallic structure 2 of the aircraft 1, which protects the cable 3 from lightning.

The 2 twisted pairs 34a and 34b are characterized by iterative impedance and low cross-talk between them.

Figure 4:
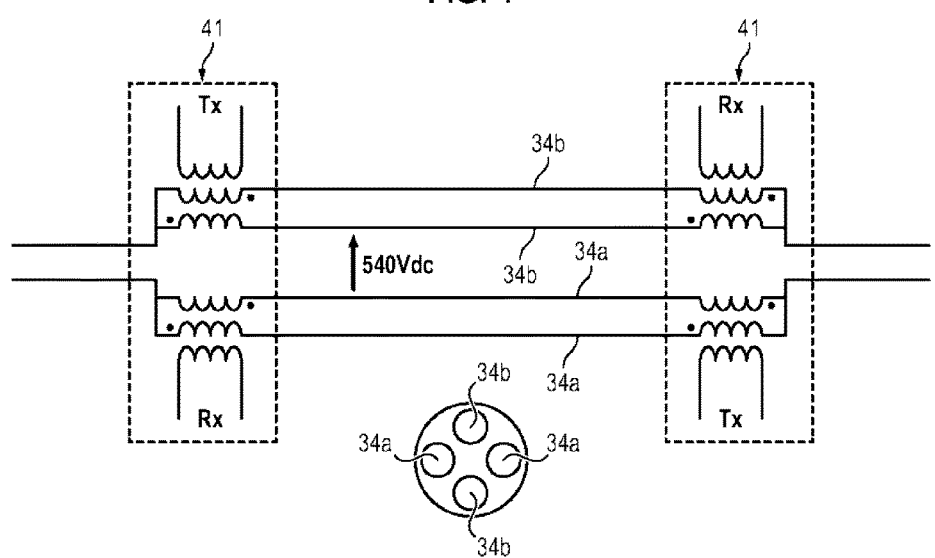
FIG. 4 schematically represents the coupling of data in a transmission device according to the invention.

In reference to FIG. 4, in the case of bidirectional transmission two of the conductors 34a are connected on the one hand to the sender of the first equipment and on the other hand to the receiver of the second equipment, and two of the conductors 34b are connected on the one hand to the receiver of the first equipment and on the other hand to the sender of the second equipment.

The receiver 200 and the sender 100 are both arranged to exchange COFDM signals (Coded Orthogonal Frequency Division Multiplexing).

For this purpose, they each comprise a COFDM coupler 44.

The data are transmitted in the form of COFDM signals. This serves to pass through maximum data in the cables by overcoming imperfections in cables.

This multiplexing method is known per se and will not be detailed here: it simply has to be noted that this method consists of dividing the signal to be transmitted into subsets having a low passband, which are each used to modulate a relatively high number of orthogonal carriers.

Figure 5:
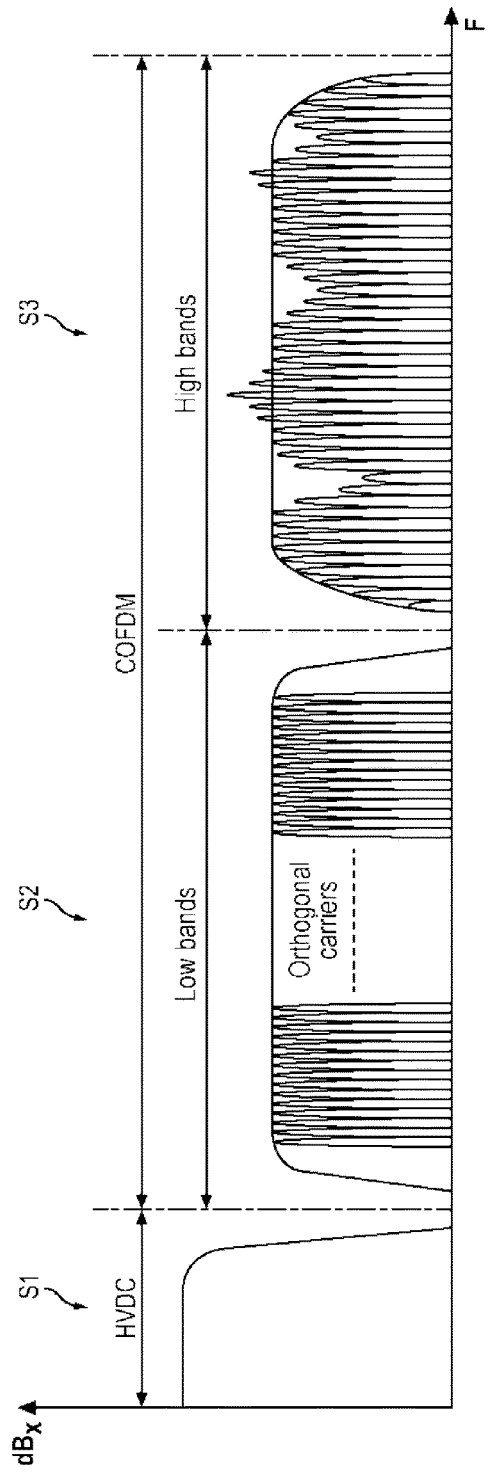
FIG. 5 represents the spectrum of the power signal and of the data signal in an embodiment of a transmission device according to the invention.

As shown in FIG. 5, multiplexing the data by orthogonal division of frequencies allows the data transmission S2 to be outside the noise spectrum of the power transmission S1.

The data sender 100 and the data receiver 200 each comprise an inductive coupler 41.

The inductive coupler 41 ensure filtering of data signals in common mode. It acts as a high-pass filter by letting through only those signals having a frequency greater than the frequency of the power supply between the COFDM coupler 44 and the transmission line 3. The inductive couplers 41 limit noise caused by the power supply on the data signals.

The data sender 100 and the data receiver 200 each comprise a low-pass filter 42 filtering the power supply. The power source 300 is connected to the cable 3 by means of a low-pass filter 42 and the equipment 20 is supplied with power by means of another low-pass filter 42. The low-pass filters 42 ensure filtering of the power supply by letting through only those signals having a power less than the frequency of the data signals. The low-pass filters 42 limit noise caused by the power supply on the data signals.

The data receiver 200 can also comprise a DC/AC converter to transform the HVDC current transmitted over the cable 3 into an AC current for supplying the equipment 20.

The power and data transmission device can also comprise a monitoring module of a state of a transmission cable 3.

The sender 100 is configured to send a test signal by carrier modulation according to a COFDM mode, and the receiver 200 is configured to detect downstream of the transmitter signals corresponding to the sent test signals, and to analyse the carriers of the detected signal with respect to the sent signal and deduce therefrom the state of the cable.

In fact, modification to the properties of the cable 3 causes an alteration of the signal carriers. Monitoring the carriers therefore allows deducing a state of the transmission cable.

FIG. 5 shows the signal sent by the sender 100. The signal spectrum comprises:
- a first portion which corresponds to the power signal S1,
- a second portion which is in an average frequency band and which is a data signal S2,
- a third portion which is in a frequency bands relatively high and which forms the test signal S3.

The impedance characteristic of the cable is known up to the highest frequencies of data transmission by COFDM carriers.

In case of degradation of the cable, disruption to the iterative aspect of the impedance characteristic of the latter therefore occurs. The response of the cable 3 will no longer be that of a cable with iterative impedance and, viewed from the sender, will present a complex impedance which is revealed by resonance phenomena generating discontinuity in the frequential response of the cable. Study of the frequency response detects an alteration of the physical characteristics of the cable 3. Local modification of the geometry of the cable 3 introduces series resonance strongly decreasing impedance for a particular frequency corresponding to the resonance frequency (resulting in attenuation of the carrier at this frequency) or parallel resonance causing a surge to the resonance frequency.

FIG. 5 shows that some carriers of the test signal S3 are attenuated, while other carriers of the test signal S3 are amplified. The location of the malfunction along the cable depends on the frequency of the altered carrier: the further the malfunction is from the sender the more the altered carrier has a low frequency.

Disruptions caused will have an impact depending on the frequency of excitation and of the distance of the malfunction from the starting point of the carriers.

The receiver 200 is therefore configured to study the frequency response of signals detected for detecting a malfunction of at least one carrier and deduce therefrom an alteration of the cable.

The sender 100 can in particular be configured to simultaneously transmit data signals with test signals, the test signals being transmitted in frequency bands higher than frequency bands of data signals.

In fact, adding high-frequency bands to the test signal heightens the directional capacity of the system.

Monitoring over time of the amplitudes of the different carriers identifies the progressive degradations of the cabling, prior to loss of communication function.

The power and data transmission device can also comprise a monitoring module 130 of the appearance of electrical arcs internals to the cable. Partial discharges (or premises of electrical arcs) between two conductors of the cable are detected in the same way as for other malfunctions by the occurrence of variations in local impedance on line. These variations generate complex impedances which are also revealed by modulation of amplitude of some carriers of the COFDM multiplexing profile.

The transmission device 3 can also comprise a measuring module 150 of the power supply for detecting variations in the series resistance of the cable 3. In fact, a variation of the series resistance of the cable indicates a failure on the transmission line.

Figure 6:
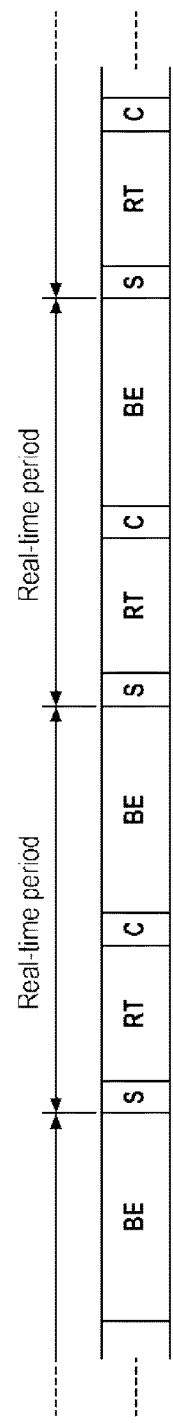
FIG. 6 represents the synchronisation carriers in the data signal in an embodiment of a transmission device according to the invention.

In reference to FIG. 6, to improve reliability of the transmission of data critical for safety, transmission time slots are allocated to data critical flows for safety.

Figure 7:
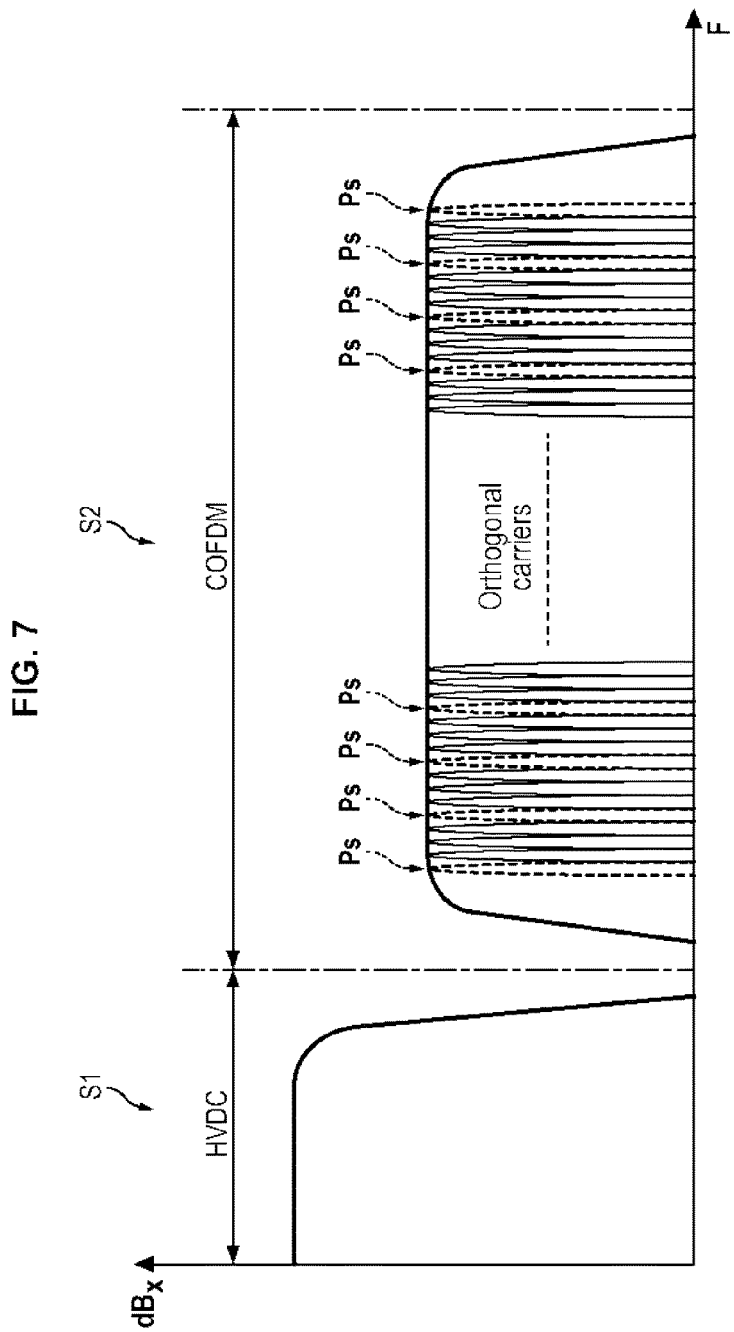
FIG. 7 represents an example of transmission frame pattern in an embodiment of a transmission device according to the invention.

In reference to FIG. 7, synchronisation carriers Ps are dedicated to phase-controlling of the time basis of the receiver 100.

The internal sequencer of the coupler 41 of the sender 100 (referred to as master coupler hereinbelow) generates a transmission frame pattern allocating transmission time slots.

The internal sequencer of the master coupler 41 allocates separate transmission time slots for critical data and non-critical data.

The internal sequencer of the coupler 41 of the receiver (to be called remote coupler hereinbelow) generates a frame pattern identical to that sent by the master coupler.

The synchronisation patterns sent periodically can be allocated from a cyclic redundancy check or CRC (Cyclic Redundancy Check) for rejecting false data with an occurrence probability $>1.10^{-9}$ FH.

The CRC detects errors in transmission or transfer by addition, combination and comparison of redundant data, obtained by way of a hashing procedure.

The fast Fourier transform or FFT of the message generates an average component dependent on the phase deviation between the oscillator of the master coupler which is the reference oscillator and the time basis of the remote coupler.

The carriers modulated in phase, after FFT, deliver an average zero component, therefore with no effect on the command of the oscillator of the controlled time basis.

Detecting a synchronisation pattern forces synchronisation of the local frame of the remote coupler.

This frame is used for transport of data from the remote coupler to the master coupler with strictly the same durations of transmitted patterns.

Each transmitted message can also be allocated from a CRC for detecting erroneous messages.

The frame sent from the master coupler (and that of the remote coupler) is cut up into sequences comprising the following elements:
- Synchronisation pattern;
- Critical data in real-time;
- CRC check pattern calculated from the critical data;
- Non-critical Best Effort data (the size is dimensioned by the preceding patterns and real-time periodicity).

The sequence allocated to critical data in real-time is dimensioned to allow accommodation of all the real-time data.

The sequence allocated to non-critical Best Effort data is dimensioned as a function of the time remaining after allocation of time to the critical data.

Best Effort data are stored in a buffer registry (FIFO) to support temporary weaknesses of the possibility of passband available over the transmission channel of Best Effort data.

The invention claimed is:

1. A device for transmission by power-line communication between two items of equipment on board an aircraft, the device for transmission by power-line communication comprising a transmission cable connecting the two items of equipment, the transmission cable being configured to simultaneously transmit a power supply and a data signal and comprising two twisted pairs of conductors, wherein the device comprises a data sender comprising a COFDM coupler configured to modulate a signal by carrier modulation according to a COFDM mode, and a data receiver comprising a COFDM coupler configured to demodulate a signal modulated by carrier modulation according to a COFDM mode, and wherein the data sender is configured to send a test signal by carrier modulation according to a COFDM mode, the data receiver is configured to detect signals corresponding to the sent test signals and analyse the carriers of the detected signal with respect to the sent signal and deduce therefrom the state of the transmission cable.

2. The device for transmission by power-line communication according to claim 1, wherein the test signal is transmitted in a frequency band higher than a frequency band of the data signal.

3. The device for transmission by power-line communication according to claim 2, wherein the sender is configured to simultaneously transmit data signals with test signals.

4. The device for transmission by power-line communication according to claim 1, wherein the data receiver is configured to analyse the frequency response of detected signals for detecting a malfunction of at least one carrier and deduce therefrom an alteration of the transmission cable.

5. The device for transmission by power-line communication according to claim 4, wherein the data receiver is configured to locate a malfunction along the transmission cable as a function of the frequency of an altered carrier.

6. The device for transmission by power-line communication according to claim 1, wherein the data receiver is configured to monitor over time the amplitudes of the different carriers to identify degradations of the transmission cable.

7. The device for transmission by power-line communication according claim 1, wherein the data sender and the data receiver each comprise an inductive coupler between the COFDM coupler and the transmission line filtering the data signals by letting through only those signals having a frequency greater than the frequency of the power supply, and wherein the data sender and the data receiver each comprise a low-pass filter filtering the power supply by letting through only those signals having power less than the frequency of the data signals.

8. The device for transmission by power-line communication according to claim 1, wherein the data sender and the data receiver are data senders/receivers, the transmission cable being configured for bidirectional transmission of data, one of the pairs of conductors being allocated to the transmission of data in one direction, the other pair of conductors being allocated to the transmission of data in the other direction.

9. The device for transmission by power-line communication according to claim 1, wherein the data receiver comprises a measuring module of the power supply for detecting variations of the series resistance of the transmission cable.

10. The device for transmission by power-line communication according to claim 1, wherein the data sender is configured to allocate separate transmission time slots for data critical to the safety of the aircraft and data non-critical to the safety of the aircraft.

* * * * *